April 9, 1968 W. E. A. SHELTON 3,376,715
KNITTING INSTRUMENTS

Filed Aug. 12, 1965 7 Sheets-Sheet 1

April 9, 1968  W. E. A. SHELTON  3,376,715
KNITTING INSTRUMENTS
Filed Aug. 12, 1965  7 Sheets-Sheet 7

United States Patent Office 3,376,715
Patented Apr. 9, 1968

3,376,715
KNITTING INSTRUMENTS
William E. A. Shelton, 61 Launde Road,
Leicester, Oadby, England
Filed Aug. 12, 1965, Ser. No. 479,173
Claims priority, application Great Britain, Aug. 19, 1964,
33,794/64
6 Claims. (Cl. 66—64)

ABSTRACT OF THE DISCLOSURE

Knitting machine with two opposed beds respectively equipped with hooked elements and opposed points and with means advancing and retracting same in opposite directions: each element having a hook and a stem with an eye-like recess and each point having a leading end in which there is a recess to accommodate hook of opposed element, said end providing a point tip which is buried in the eye-like recess of the opposed hooked element upon relative movements taking place between the latter and the point to cause the hook to be accommodated in the recess in the point and thus to be closed.

This invention appertains to knitting instruments in the form of compound, i.e. two-piece, needles, and also concerns knitting machines equipped with such needles and methods of operating the latter.

Broadly, compound needles consist of two independently actuated elements, viz. a hooked element to form the knitted loop and a second element to pass the old loop over the new loop.

Compound needles were originally devised with the aim of overcoming the inherent disadvantages of both bearded and latch needles. It has heretofore been generally acknowledged that the one-piece bearded needle is most suited to the production of very fine gauge fabrics. But such bearded needles have serious drawbacks in that they require loop forming sinkers, dividers, pressers and knocking-over bits (some of which additional elements have complicated two-directional movements) to function in conjunction therewith in carrying out the knitting action.

On the other hand, latch needles, although they can knit without the assistance of loop forming sinkers and pressers, have moving pieces (latches) the hook-opening and closing movements of which necessitates comparatively long movements of the needles, thereby imposing limitations on the speeds of knitting. Moreover, latch needles cannot be made in such fine gauges as bearded needles owing to the frality of the walls of the latch opening.

Compound needles are thus simple to manufacture, have no articulated parts and are subject to a minimum of fatigue.

However, all compound knitting needles heretofore devised have, so far as I am aware, comprises interfitted or interengaged co-adjacent elements adapted to work in the same tricks or grooves formed in a common bed.

The object of the present invention is to provide a generally improved compound needle which can also be used for transference of loops either to adjacent or to opposing needles, thereby obviating the necessity to provide separate and additional fashioning points, as will be hereinafter described.

The improved compound knitting needle constituting this invention comprises two longitudinally alignable and opposable elements which are adapted to be independently actuated and relatively slidable in a common plane, the operative end of one of these elements being provided with a hook and having in its stem a recess located behind the said hook, and the opposing end of the other element being formed both to accommodate the hook and to provide a longitudinally extending pointed portion which, upon appropriate relative sliding movement of the elements, is disposed to close the hook, with the tip of the pointed portion located and buried in the aforesaid recess.

For convenience in the following further description the element provided with a hook will be hereinafter referred to as the "hooked element," whereas the opposing element will be referred to as the "point."

Preferably, the operative portion of the point has a pointed tip, is slender and may conveniently be formed by deeply recessing the back of the point, this deep recess being so shaped and proportioned as to accommodate the hook whenever the two opposed elements are caused to slide together with their operative ends in contact.

If desired, the back or inner edge of the leading end of the stem of the point may be tapered somewhat to provide good entry into the "old" loop through which a new loop is drawn during knitting.

With the elements opposing one another in use their back edges are in alignment.

The longitudinally opposed elements of compound needles according to this invention work in respectively different but opposed beds, this opening up the possibility that by provision for relatively shogging these beds hooked elements and points can be used and so suitably operated as to effect the lateral transference of loops from predetermined hooked elements to adjoining similar elements in the same bed, e.g., for narrowing and widening, as will be hereinafter described.

The invention also includes within its scope, however, a manner of operation of the elements whereby loops can be transferred over from hooked elements in one needle bed to opposed hooked elements in an opposite needle bed, as in "rib-to-plain" transfer.

In order that the invention may be more clearly understood and readily carried into practical effect, specific examples of the hooked element and the point of the improved compound needle used as a knitting/transfer instrument, a layout of a knitting machine equipped with such instruments and ways in which the said instruments can be used will now be described with reference to the accompanying drawings, wherein.

Like parts are designated by similar reference characters throughout the drawings.

Referring to FIGURES 1–4, it will be seen that the hooked element 1 of the improved compound needle comprises a straight flat shank 2 having parallel front and back edges 2a and 2b respectively. Extending forwardly from the leading end of the shank 2 is a relatively thin stem 3 on which the hook 4 of the element is formed. The portion 3a of the stem 3 immediately adjoining and behind the root of the hook 4 is at first of the same thickness as the latter but then slopes outwardly at 3b to provide a tapering belly 5. A point-receiving recess 6, similar to the eye in a spring bearded needle, is formed in the belly 5 by stamping. The back or bottom 6a of the recess 6 is in alignment with the front (tapered) edge of the portion 3a of the stem 3, whereas the lower or inner closed end 6b of the said recess is inwardly curved as shown more clearly in FIGURE 2.

Figure 1:
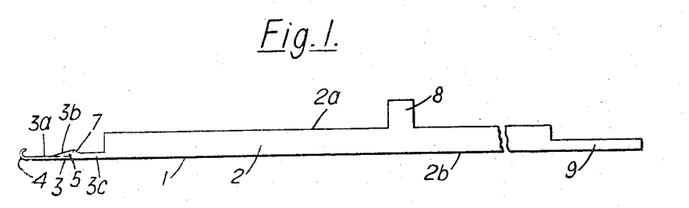
FIGURE 1 is a side view of one of the hooked elements.
Figure 2:
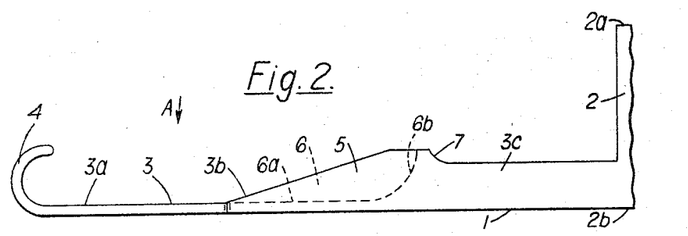
FIGURE 2 is a detail side view of the operative portion of the hooked element ringed round by a chain line in FIGURE 1.
Figure 3:
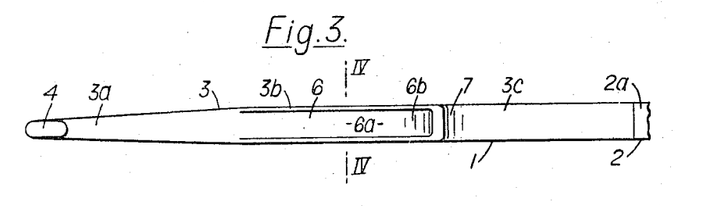
FIGURE 3 is a front edge view of this operative portion as seen in the direction of the arrow A in FIGURE 2.
Figure 4:
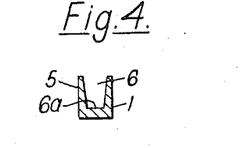
FIGURE 4 is a detail cross-sectional view of a portion of the stem of the hooked element taken on the line IV—IV of FIGURE 3.

The portion 3c of the stem 3 is somewhat wider, from front to back, than the corresponding dimension of the portion 3a. The outer edge of the portion 3c merges into the back of the recessed belly 5 by way of an inwardly curved shoulder 7. This shoulder is adapted to retain an "old" loop, such as that indicated at o1, in FIGURES 9 and 10, when the hook 4 is at clearing height, thereby ensuring good clearance between the old loop and the tip of a point entering the recess 6. As depicted in FIGURE 1, the outer edge 2a of the shank 2 has formed thereon an operating butt 8, whereas the tail end of this shank may conveniently be recessed to provide a selector tail 9 the purpose of which will be hereinafter explained.

Figure 11:
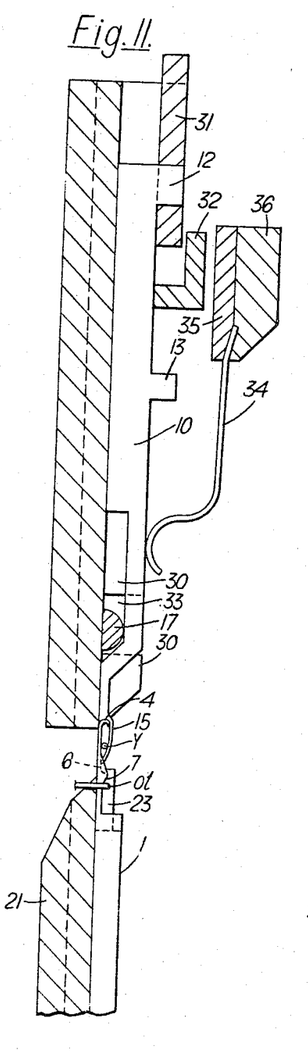
FIGURES 11, 12 and 13 are three cross-sectional views each corresponding to a part of FIGURE 9 but respectively depicting successive later stages of a normal knitting cycle of which the starting position is shown in the last mentioned figure, FIGURES 14–18 inclusive is a series of somewhat similar cross-sectional views illustrating the manner in which the said compound knitting/transfer needles are employed to effect the lateral transference of loops from predetermined hooked elements to adjoining hooked elements in the same bed, i.e., for narrowing or widening, and FIGURES 19, 20 and 21 (intended to follow on from FIGURES 14, 15 and 16) illustrate how a loop is transferred over from a hooked element in one needle bed to an opposed hooked element in an opposite needle bed during a rib-to-plain transfer.
Figure 12:
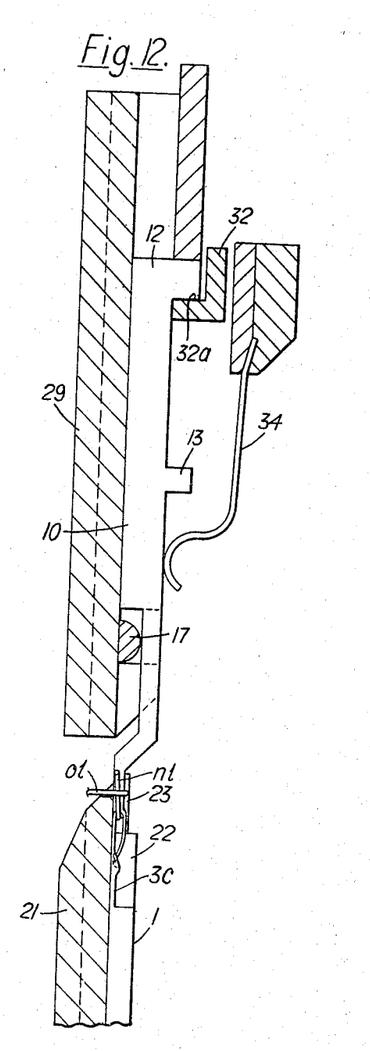
Figure 13:
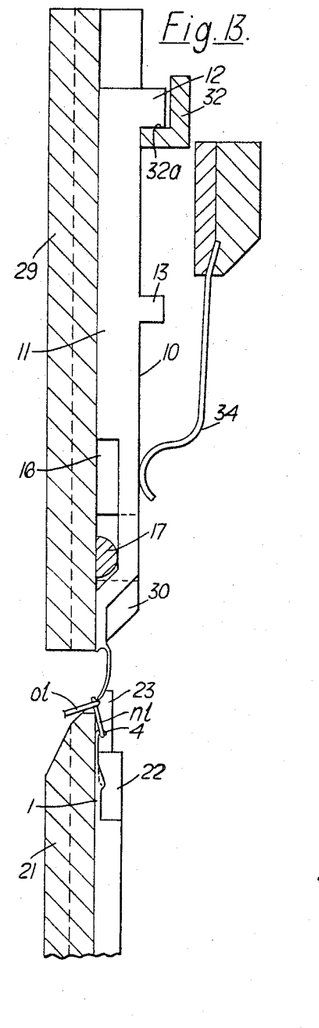

A point to complement and co-operate with a hooked element 1 such as that just described will now be defined in detail with reference to FIGURES 5–8. As will be noted, the point is generally designated by the numeral 10. Like the hooked element 1, the point is provided with a flat shank 11 having parallel front and rear edges 11a and 11b respectively. The front edge 11a has formed thereon upper and lower point operating butts 12 and 13. The operative end of the point 10 which is to oppose a hooked element 1 is formed at 14, by deeply recessing it, both to accommodate the hook 4 and also to provide a longitudinally extending pointed portion 15 which, upon appropriate relative sliding movement between the element 1 and the point 10, is disposed to close the said hook, with the tip 15a of the pointed portion located and buried in the aforementioned receiving recess 6 in the manner depicted in FIGURES 11, 14 and 15. A transverse concave edge 15b is provided on the point 10 to define the inner end of the deep recess 14 in the back thereof, this transverse edge thus constituting an abutment determining the relative positions of the hooked element 1 and the point 10—with the hook 4 closed and the pointed tip 15a buried in the recess 6. That is to say, the radius of the curve of the edge 15b is such as to correspond with that of the outer edge of the hook 4 of the opposed hooked element 1. In this way, the said hook can fit snugly within the concavity of the edge 15b whenever the hooked element 1 and the point 10 are moved together to the fullest extent (to close the normally open hook). The back part 15c of the point 1), in the vicinity of the free end of the transverse concave edge 15b, is slightly tapered, as shown more clearly in FIGURE 7, to provide good entry into the "old" loop o1 through which a new loop n1 is drawn during knitting. Moreover, the back of the shank 11 has formed therein, at or near its leading end, a recess 16 to accommodate a point-raising bar 17 the purpose and operation of which will be hereinafter described. Adjoining and integral with the leading end of the flat shank 11 is a relatively thin stem 18 supporting the pointed portion 15. The opposite sides of the stem 18 are longitudinally grooved at 19 to facilitate the formation of a new loop n1 which is drawn by a hooked element 1 through the old loop o1 as illustrated in FIGURE 12. Thus, the thickness of the point 10 at the region 20, between the two grooves 19, is about the same as that of the top of the hook 4. In addition, the point 10 is provided, at the back of its pointed portion 15, with a shoulder 15d adapted to retain a loop penetrated and received by the point from the opposed hooked element 1 during a loop transferring action, as will be hereinafter described.

Figure 5:
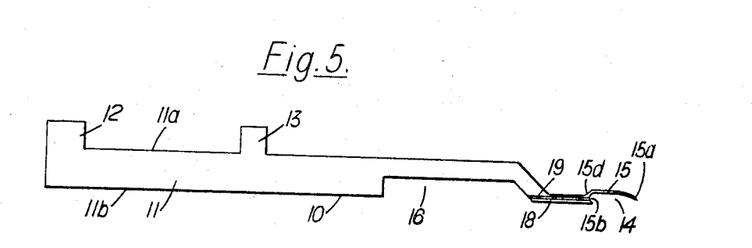
FIG. 5 is a side view of one of the points.
Figure 6:
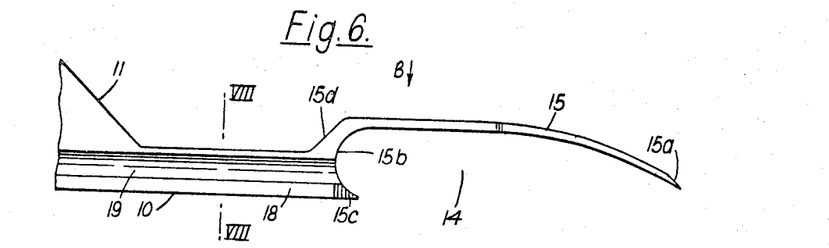
FIGURE 6 is a detail side view of the operative portion of the point ringed round by a chain line in FIGURE 5.
Figure 7:
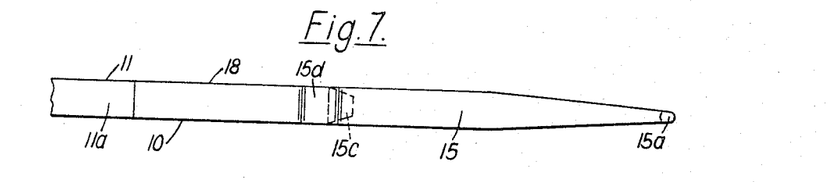
FIGURE 7 is a front edge view of this operative portion as seen in the direction of the arrow B in FIGURE 6.
Figure 8:
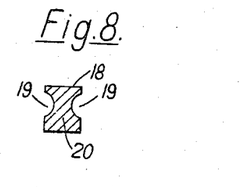
FIGURE 8 is a detail cross-sectional view of a portion of the stem of the point taken on the line VIII—VIII of FIGURE 6.

In FIGURES 1 and 5, the hooked element 1 and the point 10 are drawn actual size for a knitting machine which is to be equipped with approximately seven of the improved compound needles per inch. Such needles are about .050″ thick.

The overall dimensions of the longitudinally opposed hooked element and point of a compound needle according to this invention, especially the size of the hook 4 of the hooked element, are judiciously chosen to suit the type and count of yarn to be used and the character of the knitting structure to be produced.

Figure 9:
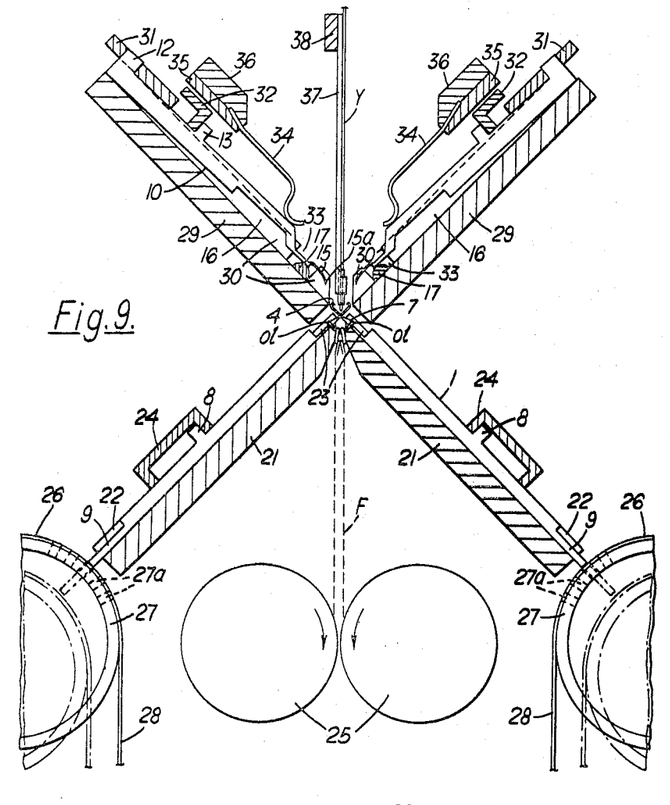
FIGURE 9 is a schematic layout, in cross-section, of one form of knitting machine equipped with compound knitting/transfer needles of the improved form.
Figure 10:
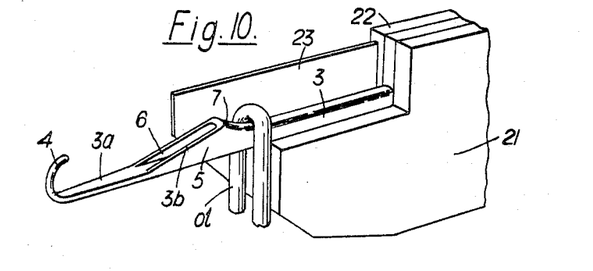
FIGURE 10 is a detail perspective view illustrating one of the verge bits in a tricked bed housing hooked elements.
Figures 16, 17:
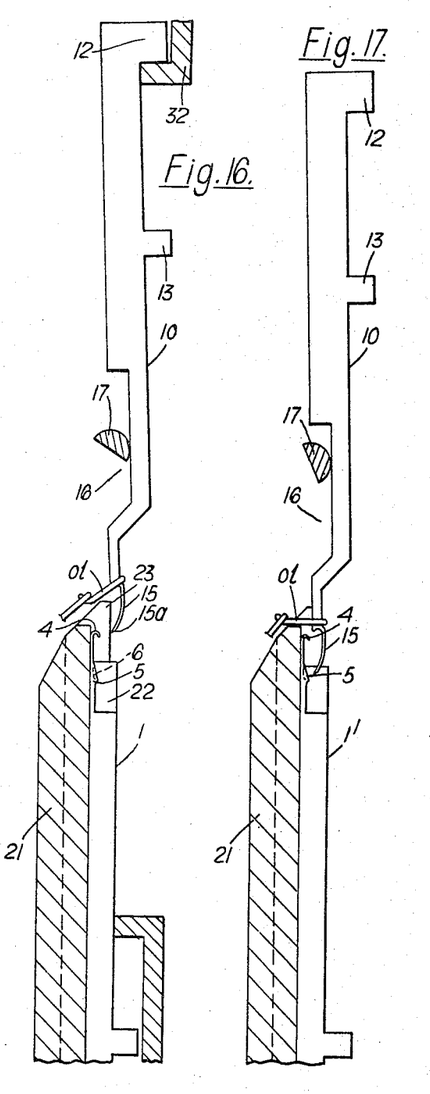

One typical layout of a flat bed rib knitting machine equipped with compound needles 1, 10 of the character herein defined will now be described, merely by way of example, with reference to FIGURES 9 and 10. This machine is provided with two lower flat beds 21 each having formed therein parallel transverse tricks 11 to receive hooked elements 1 which are longitudinally slidable therein. The two beds 21 are angularly disposed, as shown in FIGURE 9, and each of them is fitted along its upper margin with verge bits 23 (FIGURE 10) disposed to flank opposite sides of the stems 3 of the elements 1. Each of the lower beds 21, moreover, is adapted to be shogged, i.e. shifted endwise, to the extent of one needle space or a multiple of such spaces for loop transferring purposes during narrowing or widening. Slidable cam carriage means fitted with cams for action on the operating butts 8 of the elements 1 are movable to and fro over and along the beds 21. These cam carriage means are not shown, but cams for action on the butts 8 are provided at 24. Arranged below and centrally between the two lower tricked beds 21 is a pair of fabric take-down rollers 25, fabric as drawn off the hooked elements 1 being diagrammatically represented at F. Beneath the lower margin of each bed 21 there is provided a selecting mechanism 26 for determining which of the hooked elements 1 in that bed shall be advanced to clear and take yarn and which not. Each mechanism 26, which may be bodily movable into and out of an operative position, as shown, may advantageously be of a form including a regularly apertured and intermittently rotatable drum 27 around which is passed a film 28 perforated at predetermined points, according to patterning requirements. The idea is that hooked elements 1 the tails 9 of which are prevented by an imperforate portion of the relevant film 28 from dropping through an aperture 27a in the drum 27 shall function in one appropriate manner, whereas hooked elements the tails of ing the loop o1, is again slightly advanced and at the same time the point-raising bar 17 is returned to its rest position thereby permitting the tip 15a of the point to engage in the recess 6 in said freshly presented element 1′. In FIGURE 17 the point is shown advanced as just mentioned and in the course of being lowered to position the tip 15a in the recess 6.

Figure 18:
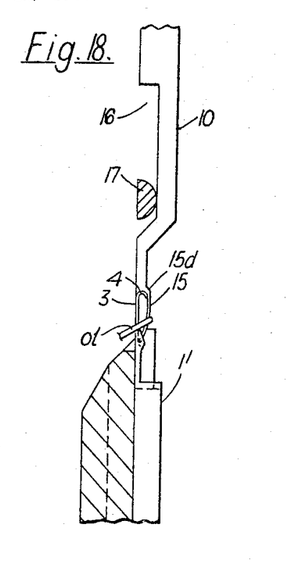

Thereafter, and as illustrated in FIGURE 18, both the point and the freshly presented hooked element are caused to rise together until the said hooked element is at clearing height and the loop o1 is once again on the pointed portion 15 of the point. This upward movement of both elements together is followed by a final upward or retracting movement of the point alone as the result of which the loop o1 is finally transferred on to the stem 3 of the freshly presented hooked element 1.

Figure 19:
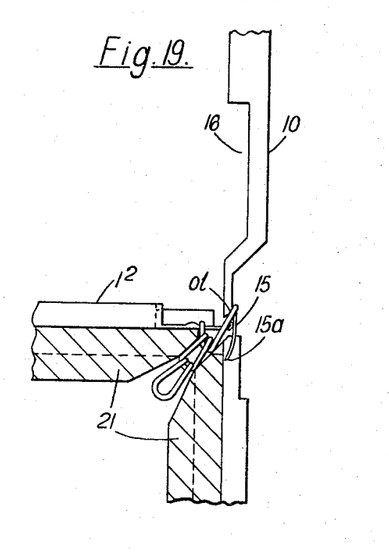
Figure 20:
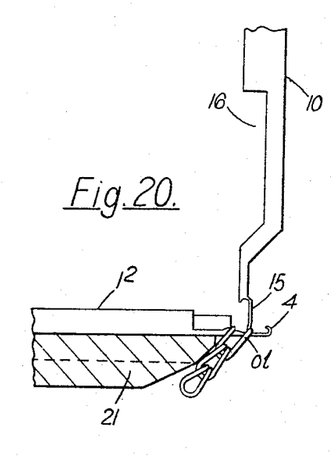
Figure 21:
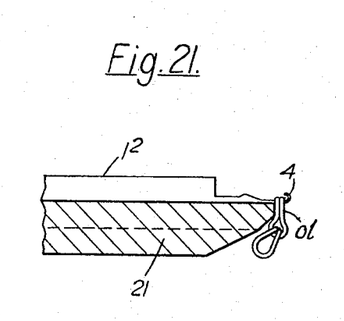

In a "rib-to-plain" transfer operation wherein a loop is transferred from a hooked element 1 in one of the two lower beds 21 to an opposing similar element in the other of the said lower beds, the preliminary stages are identical to those hereinbefore described with reference to FIGURES 14, 15 and 16. Thereafter, and as shown in FIGURE 19, the lower bed 21 containing the receiving hooked element $1^2$ seen at the left-hand side of the figure is shogged laterally to the extend of half a needle pitch to bring said hooked element into alignment with the relevant point 10 thereby expanding the loop o1 thereon. Consequently, when the hooked element $1^2$ rises it penetrates the expanded loop. At the completion of this movement, the left-hand lower tricked bed 21 is shogged back again into its normal position. In FIGURE 20, the hooked element $1^2$ is depicted in the course of rising further into the loop o1 whilst the relevant point is being retracted to withdraw its tip 15a from engagement with that loop. The transfer of the loop is now complete, and the hooked element $1^2$ is finally retracted to its rest position, as shown in FIGURE 21, preparatory to being subsequently advanced to clearing height for knitting of the first course of plain knitting.

When, as illustrated in FIGURE 9, two series of compound needles of the improved form, that is to say two sets of hooked elements 1 and two sets of opposed points 10, are used to produce a rib knitted structure, one series of the compound needles may operate in advance of the other series, forming the new loops over the open hooks of the said other series with the hooked elements of the latter advanced. The hooked elements and the opposed points of the said other series would then fall to loop forming position in the normal manner, this being an advantage to knit a tight fabric.

In such a case, the hooked elements and the opposed points of the said two series work, as already described, in beds disposed in two planes relatively at an angle. In this regard the beds may be at any approximate angle to the horizontal, as in conventional flat or straight bar rib knitting machines, or they may be respectively horizontal and vertical.

In an alternative form of the improved compound needle (not shown), the recess in the hooked element is formed in one side of the stem thereof by suitably rabbetting a rounded belly portion thereof. This recess is therefore an open one and the back or bottom thereof extends obliquely across and chordwise with respect to the rounded belly. The actual hooked portion of the element is, in this alternative development thinned down on the same side of the element as the recess therein, the hook being thereby offset with respect to this side and aligned with the protuberant belly portion. As to the point this is generally curved in the longitudinal direction, being of a generally flattened section, but with its tip twisted through 90° before being formed to a point. In this way the pointed tip is offset laterally with respect to the stem of the point to the extent of enabling it to enter the recess formed by rabbetting the stem of the hooked element.

Now in the case of a conventional latch needle, movements of the latch to open and close the needle hook are effected by a formed loop on the needle. Consequently, when a latch needle is empty, e.g. after a transfer or a press-off, it is necessary to employ a mechanical latch opener to open the latch preparatory to re-commencement of knitting. The compound needle of this invention obviates the necessity for a latch opener since the hook of the hooked element is opened and closed by appropriate control of the opposed point.

Another advantage of the improved compound needle provided by this invention arises by virtue of the fact that the point is controlled to cast-off an old loop, this enabling a new loop to be fully formed before the old loop is actually released. On a latch needle, on the other hand, knock-over coincides with drawing of the new loop as a result of which strain is imposed on the yarn and the new loop is malformed.

Yet another advantage of the compound needle provided by this invention is that it obviates the problem of producing tightly knitted fabrics on a bearded needle rib knitting machine. Thus, in rib knitting on a rib knitting machine equipped with the improved compound needles the new yarn is fed in at a position well clear of the old loop and as a consequence there is ample space to enter the tip of the point over the new yarn and in front of the old loop.

The dimension around the hooked element and the point of the improved compound needle, with the hook closed, is sufficiently small, relative to the count of yarn for the gauge of the machine, as to facilitate the knitting of tight fabrics. That is to say, to knit tightly, the loop only requires to be sufficiently large to pass over the closed hook. It is important to note that no additional element enters a loop during a stitch transfer (fashioning) operation thus enabling fabrics of very tight quality to be knitted on either a single bed or a rib knitting machine.

Since, moreover, every pair of opposed elements (hooked element and point) can transfer as well as knit, can be selected to knit, non-knit, or tuck, the patterning scope of a knitting machine equipped with the improved compound needles is very wide. Particularly is this so when stitch transfer can be on to adjacent needles either for fashioning or for producing lace designs by "all over" transfer effects. In addition, the improved needles permit of both block transfer for "gore" shaping and transfer from back to front beds in the execution of purl designs.

Merely for convenience in illustration, and to economise in space on the sheets of the drawings, the needle beds in FIGURES 11–21 have been shown in an upright position instead of in an inclined position as correctly shown in FIGURE 9.

I claim:
1. A knitting machine which includes, in combination: two opposed beds having therein aligned tricks; hooked elements accommodated in the tricks of one of said beds; opposed points accommodated in the aligned tricks in the other of said beds; and means in association with said beds for operating said hooked elements and points suchwise as to respectively advance and retract the same in opposite directions, the operative end of each of the hooked elements being provided with a hook and an associated stem the front of the portion of which stem adjoining the root of said hook has therein a point-receiving recess and each of the opposing points having a flat shank an edge of the leading end of which has formed therein a concave recess to accommodate the hook of the opposed hooked element, the said leading end, where said end flanks the back of said concave recess, being formed to provide a longitudinally extending pointed portion having a tip, said tip being buried in the said point-receiving recess in the stem of the opposed hooked element, upon appropriate relative movements taking place between the hooked element and the which register with a perforation in the relevant film, and so drop through an aperture in the corresponding drum, shall function differently. In any event, the mechanisms 26 are responsible for determining selective actuation of the hooked elements 1.

Arranged in strict alignment with each of the two lower beds 21 is an upper bed 29 which is tricked as at 30 to receive longitudinally slidable points 10. The upper operating butts 12 of the points in each bed 29 are engageable at required times by a lowering cam 31 adapted to advance the points in that bed seriatim. Also incorporated into the cam system associated with and movable over and along each upper bed 29 is a point catch bar 32 for simulataneous action at appropriate times upon upper and lower butts 12 and 13 of the points for the purpose of respectively retracting and advancing the points 10 collectively.

For lifting up the leading ends of the points 10 from the bottoms of their tricks 30, thereby permitting the pointed portions 15 of advancing points to pass over the hooks 4 of the opposing hooked elements 1 without contacting the same, and for thereupon lowering these leading ends under control so that the tips 15a of the points engage in the recesses 6 in the bellies 5 of the said hooked elements, there is provided in association with each upper bed 29 a point-raising bar 17 previously referred to herein. Each such bar is co-extensive with the relevant upper bed of semi-circular shape in cross-section; it is accommodated within gaps 33 formed in the walls of the tricks 30. The point-raising bars 17 are turnable about longitudinal axes, within the gaps 33, for lifting up and lowering the leading ends of the points 10 at appropriate times such as during loop transferring operations. Leaf springs 34, bearing upon the outer edges 11a of and controlling the points, are retained between pairs of fixed support bars 35, 36. Thus, the points 10 are lifted by the turning bars 17 against the spring action and are returned to the bottoms of their tricks 33 under the said action. A yarn carrier 37, suspended vertically from a horizontal bar 38, is provided to feed in to the hooked elements 1 a yarn Y.

The normal knitting movements executed by the hooked element 1 and the opposed point 10 of one of the improved compound needles herein specifically defined will now be described with reference to FIGURES 9–13. It will be assumed that the particular hooked element concerned is one located in a trick 22 in the right-hand lower bed 21, whilst the point co-operating with this element is located in the longitudinally aligned trick 30 in the left-hand upper bed 29, as viewed in FIGURE 9.

Thus, at the commencement of the knitting cycle shown in the last mentioned figure the hooked element 1 is in its fully advanced position, i.e., at clearing height, in which the "old" loop o1 is retained on the shoulder 7 at the back of the recessed belly 5 (see more particularly FIGURE 9). The point 10, on the other hand, is in its fully retracted position, with the tip 15a of its pointed portion 15 well separated from the hook 4. Moreover, the relatively thin stem 18 supporting this pointed portion 15 is resting on the outer curved face of the relevant point-raising bar 17 whose flat face is at this stage resting on the bottom of the trick 30: hence the said pointed portion is lifted up.

With the hooked element 1 still advanced to clearing height, the upper butt 12 of the point 10 is then acted upon by the point lowering cam 31 as a consequence of which the point is pushed downwards, i.e. advanced, towards the hook 4. The pointed portion 15, under the control of the now stationary bar 17, moves over the hook 4 without contacting it and thereupon, as the recess 16 in the shank 11 of the point comes opposite to the bar 17, the pointed portion 15 is permitted to move smoothly down, under the action of the spring 34, so that its tip 15a becomes buried in the recess 6 in the belly 5 of the hooked element 1 as shown in FIGURE 11. The transverse concave edge 15b on the point abuts the hook 4 which latter is now embraced and closed by the portion 15, with the newly fed in yarn Y trapped therein.

As depicted in FIGURE 12, the point 10 continues its downward or advancing movement together with downward or retracting movement of the hooked element 1 until the upper butt 12 on the point comes into contact with and rests against the inner face 32a of the relevant point catch bar 32. By virtue of being retracted from its clearing height, the hooked element 1 forms the engaged yarn Y into a new loop n1 which is drawn through the old loop o1. The hook 4 is now below or behind the old loop in the knocking-over or casting-off position.

But before the said old loop can be released and pass into the fabric F being produced, the point catch bar 32 acts on the upper butt 12 of the point and moves the latter upwards, that is to say retracts it (collectively with all the other points in the upper bed 29 concerned) to the extent necessary to disengage the point from the hook 4 thereby allowing the old loop o1 to be pulled off the tip 15a by the tension of the fabric take-down rollers 15.

Thereafter, the elements of the compound needle are restored to the starting positions shown in FIGURE 9, the point 10 being for this purpose still further retracted and the hooked element 1 being advanced by the cam 24 from its low knocking-over position to its clearing height. At this final stage, the once new loop (now the old loop) is retained on the shoulder 7 of the hooked element 1, and the point is re-positioned in readiness for the next stitch forming cycle.

As will be appreciated, by reason of the two longitudinally aligned elements of the compound needle being opposed, these elements are respectively advanced and retracted in opposite directions. Thus, assuming either an inclined disposition (as shown) or a vertical disposition of the relatively slidable elements, with the hooked element being the lower element, and the point the upper one, the said hooked element is raised to advance it and lowered to retract it, whereas the point is lowered to advance it and raised to retract it.

The movements of opposing elements for a loop transferring action laterally are illustrated in FIGURES 14–18.

Figure 14:
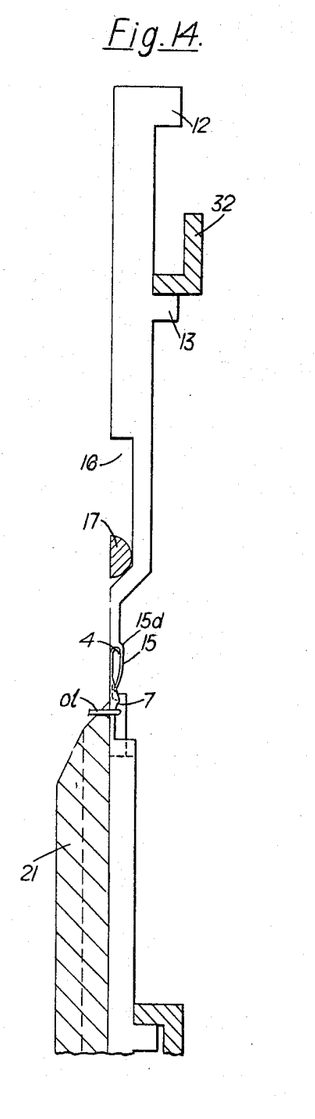

At the commencement of the transfer cycle, the hooked element 1 depicted in FIGURE 14, being a selvedge element selected by the selecting mechanism 16 is automatically raised to clearing height, whereas by virtue of the point catch bar 32 pushing down against the lower butt 13 of the opposed point 10 the latter is moved down, i.e., advanced, until the hook 4 is closed by the pointed portion 15, with the old loop o1 retained on the shoulder 7 on the hooked element.

Figure 15:
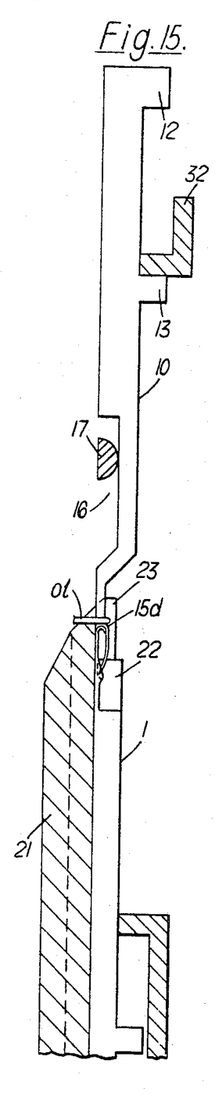

During the next stage, depicted in FIGURE 15, the point 10 continues its advancing movement, together with downward retraction of the opposed hooked element 1 until the old loop o1, after having been penetrated by and received on the pointed portion 15 of the point, is landed behind the shoulder 15d provided on the latter.

Next, with the hooked element 1 still retracted to knocking-over position, the point 10 is retracted somewhat, that is to say moved upwards, by action of the point catch bar 32 upon the upper butt 12 and, simultaneously with this movement, the relevant point-raising bar 17 is turned to the position shown in FIGURE 16 so that the point is lifted to disengage its tip 15d from the recess 6 in the belly 5 of the hooked element 1. At the completion of these simultaneous motions, and with the parts positioned as in FIGURE 16, the lower tricked bed 21 is shogged laterally to the extent of one trick relatively to the aligned upper bed 29, thereby bringing the next hooked element 1' in the lower bed into alignment with the point 10 still holding the loop o1. As to whether the lower bed 21 is shogged to the right or to the left will depend on whether a narrowing or a widening operation is in progress. With the freshly presented hooked element 1' also in its fully retracted position, the point 10, carrypoint, to cause the hook to be accommodated in the said concave recess in the point and thus to be closed by the longitudinally extending pointed portion of said point.

2. A knitting machine according to claim 1, wherein the opposed tricked beds are relatively shoggable so that the hooked elements and the points therein can be laterally displaced for loop transference.

3. A knitting machine according to claim 1, wherein there are two series of the two-part needles, i.e., two sets of hooked elements and two sets of points arranged to knit a rib knitted structure, the said two series of needles being arranged to work in two pairs of opposed beds respectively disposed in two planes relatively at an angle.

4. A knifing machine according to claim 1, wherein recesses are formed in the back edges of the shanks of the points near the leading ends of said shanks, and a point-raising bar common to all of the points is accommodated within and extends laterally through the said recesses, said bar being turnable to raise the operative ends of the points out of their tricks to permit the pointed portions of advancing points to pass over the hooks of the opposing hooked elements without contacting the same, and for lowering the leading ends of the recesses of the hooked elements.

5. A method of knitting on a knitting machine which includes, in combination: two opposed beds having therein aligned tricks; hooked elements accommodated in the tricks of one of said beds; opposed points accommodated in the aligned tricks in the other of said beds; and means in association with said beds for operating said hooked elements and points suchwise as to respectively advance and retract the same in opposite directions, the operative end of each of the hooked elements being provided with a hook and an associated stem the front of the portion of which stem adjoining the root of said hook has therein a point-receiving recess and each of the opposing points having a flat shank an edge of the leading end of which has formed therein a concave recess to accommodate the hook of the opposed hooked element, the said leading end, where said end flanks the back of said concave recess, being formed to provide a longitudinally extending pointed portion having a tip, said tip being buried in the said point-receiving recess in the stem of the opposed hooked element, upon appropriate relative movements taking place between the hooked element and the point, to cause the hook to be accommodated in the said concave recess in the point and thus to be closed by the longitudinally extending pointed portion of said point, and to which machine yarn is fed, said method comprising the steps of:

(a) advancing the points towards the hooks of the opposed hooked elements, then at clearing position with old loops retained thereon, so that the hooks are closed and the tips of the points engage in the recesses in the hooked elements, (b) continuing to advance the points whilst simultaneously retracting the hooked elements to casting-off position whereby said hooked elements are caused to form fed-in yarn into new loops and to draw the latter through old loops—at this stage positioned on the stems of the points, (c) thereupon retracting the points to disengage them from the hooks so that the old loops are pulled off the tips of the points by downward tension on the fabric being produced, and (d) further retracting the points, and also advancing the hooked elements from casting-off position to clearing position, so that the newly formed loops are retained on the hooked elements and the points are re-positioned in readiness for the next stitch forming cycle.

6. A method of knitting according to claim 5, wherein preparatory to each stitch forming cycle the leading ends of the points are lifted from their tricks, and during the first stage of said cycle are lowered again to close the hooks and engage the tips in the recesses behind the hooks.

References Cited

UNITED STATES PATENTS

| 650,376 | 5/1900 | Donner | 66—96 XR |
| 1,563,233 | 11/1925 | Scott | 66—13 |
| 2,716,878 | 9/1955 | Morris | 66—95 XR |
| 2,913,888 | 11/1959 | Amidon | 66—120 XR |
| 3,026,694 | 3/1962 | Folsom | 66—13 |

FOREIGN PATENTS

| 933,799 | 4/1948 | France. |
| 1,085,203 | 1/1955 | France. |
| 623,774 | 1/1936 | Germany. |
| 275,614 | 8/1928 | Great Britain. |

MERVIN STEIN, *Primary Examiner.*

R. FELDBAUM, *Assistant Examiner.*